(12) United States Patent
Liu et al.

(10) Patent No.: US 8,015,145 B2
(45) Date of Patent: Sep. 6, 2011

(54) SYSTEM FOR PROVIDING HEALTHCARE OPERATION SPECIFIC USER INTERFACE DISPLAY IMAGES

(75) Inventors: Zhijing Liu, Audubon, PA (US); Gary G. Hardel, Wayne, PA (US); Paul Zielinski, Gilbertsville, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 729 days.

(21) Appl. No.: 12/115,863

(22) Filed: May 6, 2008

(65) Prior Publication Data

US 2008/0306897 A1    Dec. 11, 2008

Related U.S. Application Data

(60) Provisional application No. 60/941,966, filed on Jun. 5, 2007.

(51) Int. Cl.
*G06F 17/00* (2006.01)
*G06N 7/00* (2006.01)
*G06N 7/08* (2006.01)

(52) U.S. Cl. .......................................... 706/53
(58) Field of Classification Search .................. 706/53
See application file for complete search history.

(56) References Cited

U.S. PATENT DOCUMENTS

| | | | | |
|---|---|---|---|---|
| 5,265,010 A * | 11/1993 | Evans-Paganelli et al. | ... | 600/301 |
| 5,594,638 A * | 1/1997 | Iliff | ................. | 705/3 |
| 6,272,481 B1 * | 8/2001 | Lawrence et al. | ............. | 706/45 |
| 7,024,399 B2 * | 4/2006 | Sumner et al. | .................. | 706/45 |
| 7,277,874 B2 * | 10/2007 | Sumner et al. | .................. | 706/45 |
| 7,379,885 B1 * | 5/2008 | Zakim | ............................ | 705/2 |
| 7,447,643 B1 * | 11/2008 | Olson et al. | ...................... | 705/2 |
| 7,947,463 B2 * | 5/2011 | Sirbasku | ................... | 435/7.21 |
| 2005/0027566 A1 | 2/2005 | Haskell | | |
| 2005/0065813 A1 * | 3/2005 | Mishelevich et al. | ............ | 705/2 |
| 2008/0016042 A1 | 1/2008 | McKnight | | |

OTHER PUBLICATIONS

Meeting medical terminology needs-the ontology-enhanced Medical Concept Mapper, Leroy, G.; Hsinchun Chen; Information Technology in Biomedicine, IEEE Transactions on vol. 5 , Issue: 4 Digital Object Identifier: 10.1109/4233.966101 Publication Year: 2001 , pp. 261-270.*

(Continued)

*Primary Examiner* — Michael B Holmes
(74) *Attorney, Agent, or Firm* — Alexander J Burke

(57) ABSTRACT

A system provides a user interface for viewing nursing problems with multiple levels of granularity in a knowledge base and rendered in an application that are dependent on context of problems, patient demographic information and information needed by a user interface image. A user interface system presents patient medical problem information to a user. The system includes a first search processor for automatically searching a knowledge base of information associating multiple different medical problems with corresponding attributes to find an attribute indicating a particular characteristic of a particular medical problem, in response to occurrence of an event. A display processor initiates generation of data representing a display image. The display image includes, a first image area for including data indicating candidate medical problems and associated attributes and a second image area for including data representing assigned medical problems of a particular patient and enabling a user to select a medical problem for transfer from the first image area to the second image area.

19 Claims, 14 Drawing Sheets

OTHER PUBLICATIONS

Ontology-based medical image annotation with description logics, Bo Hu; Dasmahapatra, S.; Lewis, P.; Shadbolt, N.; Tools with Artificial Intelligence, 2003. Proceedings. 15th IEEE International Conference on Digital Object Identifier: 10.1109/TAI.2003.1250173 Publication Year: 2003 , pp. 77-82.*

On search guide phrase compilation for recommending home medical products, Gang Luo; Engineering in Medicine and Biology Society (EMBC), 2010 Annual International Conference of the IEEE Digital Object Identifier: 10.1109/IEMBS.2010.5626435 Publication Year: 2010 , pp. 2167-2171.*

Enhanced methods for the collection of on-scene information by emergency medical system providers, Hampton, D.; Briscoe, K.; Smith, R.; Computers in Cardiology 1998 Digital Object Identifier: 10.1109/CIC.1998.731773 Publication Year: 1998 , pp. 221-224.*

ISO/IEC 11179-1:2004(E), Sep. 15, 2004, International Organization Standardizaion.

ISO/IEC 11179-2:2005(E), Nov. 15, 2005, International Organization Standardizaion.

ISO/IEC 11179-3:2003(E), Feb. 15, 2003, International Organization Standardizaion.

ISO/IEC 11179-4:2004(E), Jul. 15, 2004, International Organization Standardizaion.

ISO/IEC 11179-5:2005(E), Sep. 1, 2005, International Organization Standardizaion.

ISO/IEC 11179-6:2005(E), Jan. 15, 2005, International Organization Standardizaion.

IS0 18104-2003, Apr. 2004, International Organization Standardizaion.

William T. F. Goossen, PhD, RN Judy G. Ozbolt, PhD, RN, Amy Coenen, PhD, RN, Hyeoun-AE Park, PhD, RN, Charles Mead, MD, MSc, Margareta Ehnfors, PhD, RN, Heimar F. Marin RN, MSc, PhD. Model Formulation—Development of a Provisional Domain Model for the Nursing Process for Use with the Health Level 7 Reference Information Model. Jan. 22, 2004.

* cited by examiner

FIGURE 2

| Attribute Name | Required | Value Fixed | Default Value | Data Type | Allowable Values | Display Sequence | Label |
|---|---|---|---|---|---|---|---|
| Focus | Yes | Yes | Pain | String | | 1 | Focus |
| Judgment | Yes | No | Presence | String | | 2 | Judgment |
| Bearer | Yes | Yes | Patient | String | | 3 | Client |
| Body Site | Yes | Yes | Chest | String | | 4 | Body Site |
| Severity | No | No | No | Coded Value | (Severe, Mild) | | |
| Level of Certainty | No | No | No | Coded Value | (Suspected, Certain) | | |
| Priority | No | No | No | Coded Value | (STAT, Now, Routine, PRN) | | |
| Status | Yes | No | Active | Coded Value | (Active, Resolved) | 12 | Status |

FIGURE 3

| Attribute Name | Required | Value Fixed | Default Value | Data Type | Allowable Values | Display Sequence | Label |
|---|---|---|---|---|---|---|---|
| Focus | Yes | Yes | Anxiety | String | | | Focus |
| Judgment | Yes | No | Presence | RestrictList | (First, Second) | | Judgment |
| Bearer | Yes | Yes | Patient | String | | | Client |
| Related To | No | No | | ListWithText | (Job loss, hospitalization, Move, Change in marital status, Recent death in family) | | Related To |
| Status | Yes | No | Active | RestrictList | (Active, Resolved) | | Status |
| Onset | No | No | | ListWithText | (Last week, Last month, Last year, Spring, Summer, Fall, Winter) | | Onset |
| Level of Certainty | No | No | | ListWithText | (Suspected, Certain) | | Certainty |

FIGURE 4

| Attribute Name | Category | Definition |
|---|---|---|
| Bearer | Content | Individual, family, community. The entity that can be said to have the nursing phenomenon. |
| Body Site | Content | The anatomical position or location of a nursing phenomenon. |
| Focus | Content | The area of attention as described by the social mandates and professional and conceptual frameworks of professional nursing practice. |
| Related to | Content | The reason related to the problem |
| Judgment | Content | The clinical opinion, estimate or determination of professional nursing practice regarding the state of a nursing phenomenon, including the relative quality of the intensity or degree of the manifestation of the nursing phenomenon. |
| Level of Certainty | Content | A modifier of a problem that states the degree of the certainty of problem. |
| Status | Patient | The status of the problem regarding to individual patient. |
| Onset | Patient | The time that a patient visit the institution. |

FIGURE 5

| Property Name | Description | UI Behavior | Run-time Behavior |
|---|---|---|---|
| Allowed | (Yes, No) Determines whether a value may be entered for this parameter at application run-time (not maintenance run-time). | If Allowed=N, then all other properties are disabled. Drop-down control with values of 'Yes' and 'No'. | This allows data entry. |
| Required | (Yes, No) Determines whether a value is required at application run-time. | Drop-down control with values of 'Yes' and 'No'. If Required = 'Yes', then Allowed must be 'Yes'. | This indicates that the value is required. |
| Default Value | Default value may be a reference to one or more values. It will not be a reference to a value set. If there are three default values, there will be three instances of this parameter for this problem definition instance. | Button to display modal to search and pick value(s). Then value(s) come back from modal and display in properties window in a semi-colon delimited fashion. | |
| Fixed Value | (Yes, No) Defines whether or not the Default value(s) can change in the Maintenance UI and run-time UI. If Required at Maintenance = 'Yes', Fixed may not be changed from 'Yes' to 'No'. | Drop-down control with values of 'Yes' and 'No'. | The value of this parameter may not be changed. |
| Allowable Values | Reference to a value set | The value set may contain a value set and/or values. | |
| Label | String tag to appear on form – derived from the display name preference of the parameter term. | | |
| DataType | Defines the data type of the value of this parameter. Include such as Integer, Decimal, Encoded, Date, Date/time, String,Date offset | N/A | N/A |

SYSTEM FOR PROVIDING HEALTHCARE OPERATION SPECIFIC USER INTERFACE DISPLAY IMAGES

This is a non-provisional application of provisional application Ser. No. 60/941,966 filed Jun. 5, 2007, by G. G. Hardel et al.

FIELD OF THE INVENTION

This invention concerns a user interface system for presenting patient medical problem information to a user involving automatic search of a knowledge base supporting presenting and processing candidate medical conditions and associated attributes and assigned medical conditions of a patient.

BACKGROUND OF THE INVENTION

A nursing problem is a clinical term that describes a patient medical condition (problem). When creating a treatment plan for a patient, a nurse usually formulates a treatment plan based on patient problems. Normally, a problem is identified and then a treatment plan is created. A nurse needs to view active and past patient problems when creating a treatment plan. Known systems for providing user interface images are fixed and non-adaptive and fail to provide in a user friendly, easily navigable fashion a view of patient active and past problems for use in creating a treatment plan, for example. A system according to invention principles addresses these deficiencies and related problems.

SUMMARY OF THE INVENTION

A system provides a user interface for viewing nursing problems with multiple levels of granularity based on context of problems and patient demographic and other information to increase effectiveness and efficiency of viewing and navigating nursing problem information. A user interface system presents patient medical problem information to a user. The system includes a first search processor for automatically searching a knowledge base of information associating multiple different medical problems with corresponding attributes to find an attribute indicating a particular characteristic of a particular medical problem, in response to occurrence of an event. A display processor initiates generation of data representing a display image. The display image includes, a first image area for including data indicating candidate medical problems and associated attributes and a second image area for including data representing assigned medical problems of a particular patient and enabling a user to select a medical problem for transfer from the first image area to the second image area.

BRIEF DESCRIPTION OF THE DRAWINGS

FIG. 2 shows a table listing significant attributes of the "chest pain" problem, as an example, according to invention principles.

FIG. 3 shows a table listing significant attributes of the "anxiety" problem, as another example, according to invention principles.

FIG. 4 shows a table indicating definition and category of problem attributes, according to invention principles.

FIG. 5 shows a table listing characteristics of problem attribute properties, according to invention principles.

DETAILED DESCRIPTION OF THE INVENTION

Figure 1:
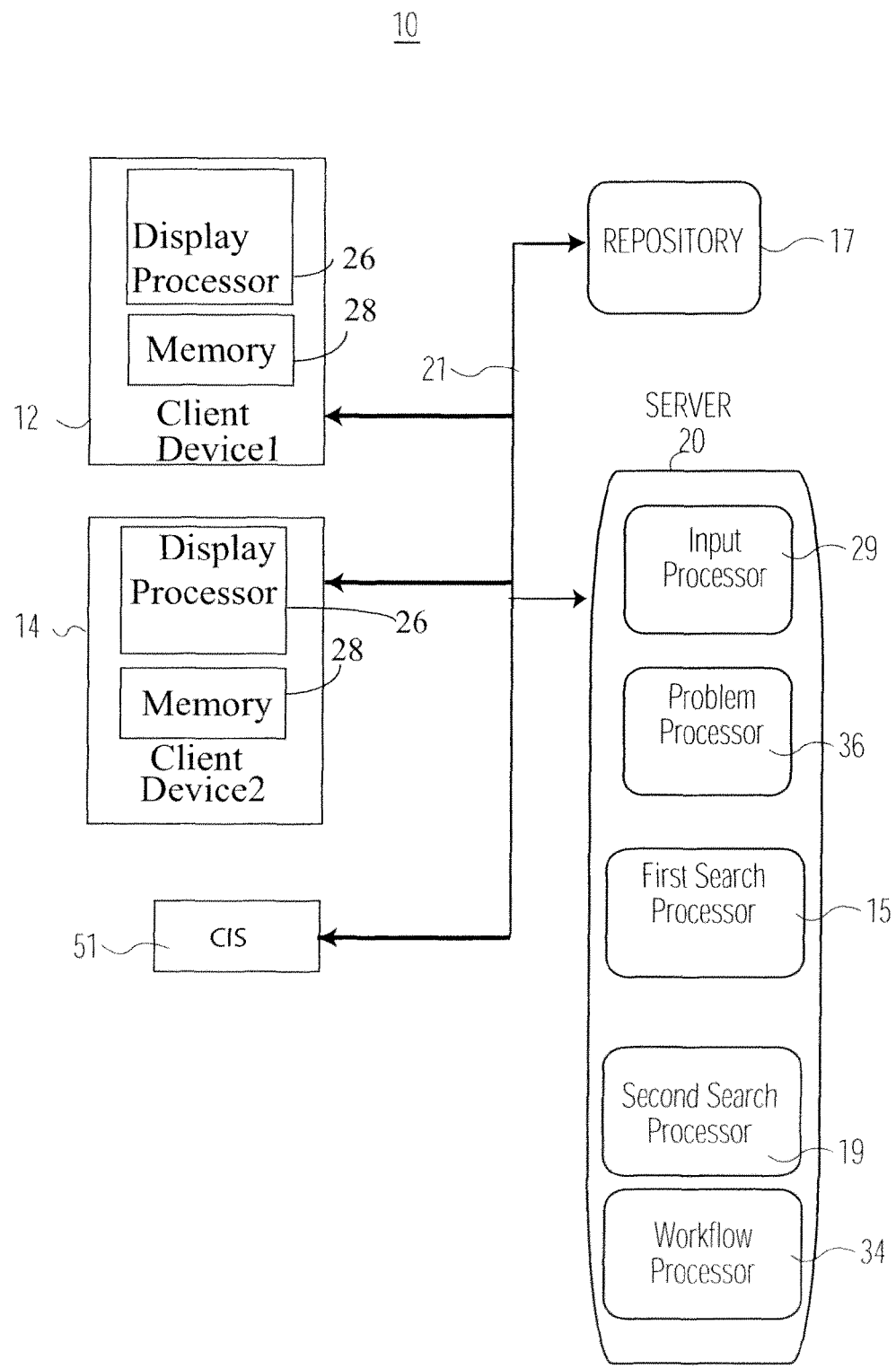
FIG. 1 shows a user interface system for presenting patient medical problem information to a user, according to invention principles.
Figure 6:
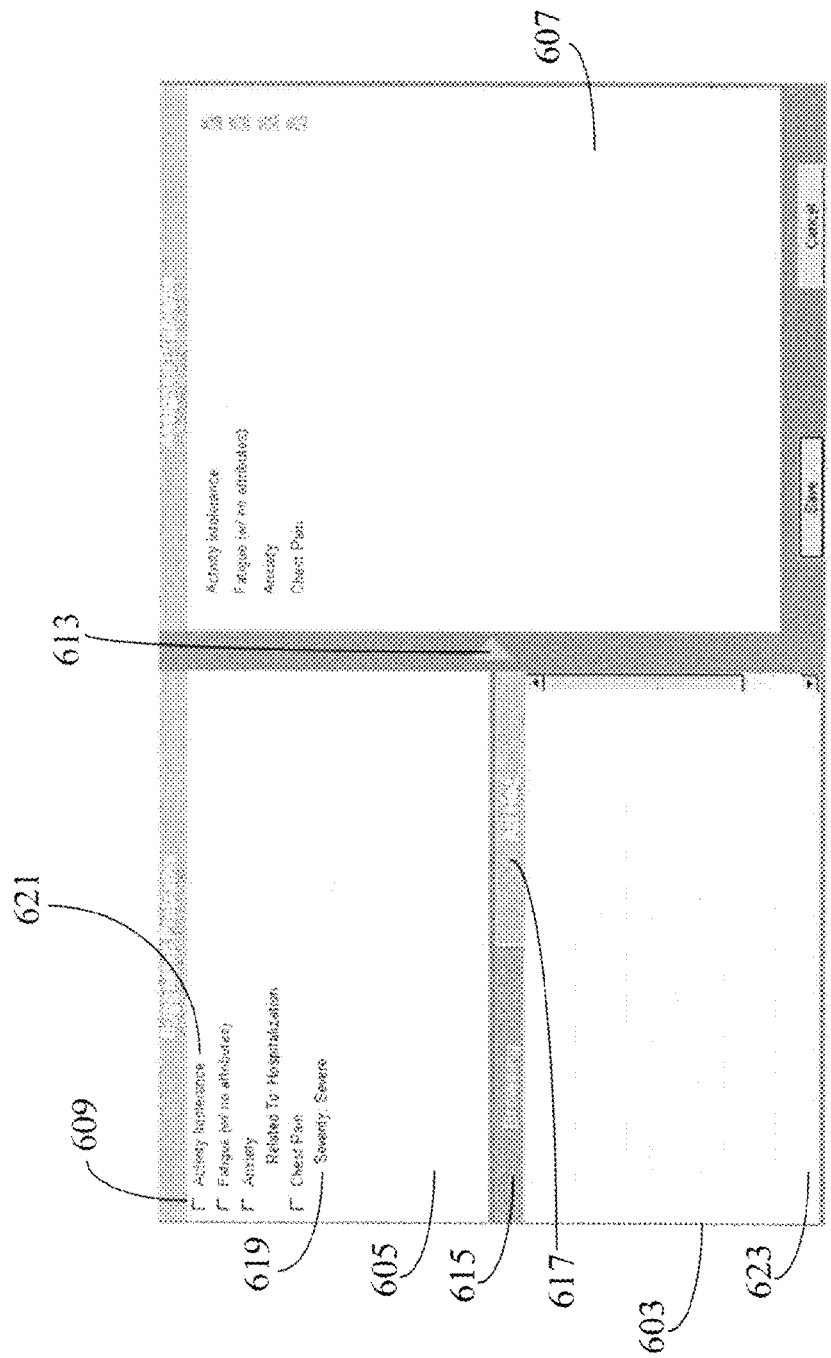
FIGS. 6-9 illustrate user interface display images of a nursing problem application, according to invention principles.

A system provides user-centered and knowledge based user interfaces (and associated display images) to present nursing problems with multiple levels of granularity. Data indicating the nursing problem granularity comprises a knowledge base used by an application providing user interface display images that are dependent on the context of problems, patient demographic information and other information requirements. A first level of granularity provides brief nursing problem information, a second level of granularity provides more nursing problem attributes but not everything concerning a problem and a third level of granularity provides nursing problem attributes determined in the knowledge base, for example. Specifically, in a three level granularity example, a first level of granularity provides brief nursing problem information for a quick view, the second level provides some key information, but not detailed information and the third level provides more detailed nursing problem information. The system increases the effectiveness and efficiency of viewing and navigating nursing problem information, which is important when making decisions regarding treatment interventions and when performing those interventions.

A processor as used herein is a device and/or set of machine-readable instructions for performing tasks. A processor comprises any one or combination of, hardware, firmware, and/or software. A processor acts upon information by manipulating, analyzing, modifying, converting or transmitting information for use by an executable procedure or an information device, and/or by routing the information to an output device. A processor may use or comprise the capabilities of a controller or microprocessor, for example. A processor may be electrically coupled to any other processor enabling interaction and/or communication there-between. A display processor or generator is a known element comprising electronic circuitry or software or a combination of both for generating display images or portions thereof. A user interface comprises one or more display images enabling user interaction with a processor or other device.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters. A user interface (UI), as used herein, comprises one or more display images, generated by a display processor and enabling user interaction with a processor or other device and associated data acquisition and processing functions.

The UI also includes an executable procedure or executable application. The executable procedure or executable application conditions the display processor to generate signals representing the UI display images. These signals are supplied to a display device which displays the image for viewing by the user. The executable procedure or executable application further receives signals from user input devices, such as a keyboard, mouse, light pen, touch screen or any other means allowing a user to provide data to a processor. The processor, under control of an executable procedure or executable application, manipulates the UI display images in response to signals received from the input devices. In this way, the user interacts with the display image using the input devices, enabling user interaction with the processor or other device. The functions and process steps (e.g., of FIG. 14) herein may be performed automatically or wholly or partially in response to user command. An activity (including a step) performed automatically is performed in response to executable instruction or device operation without user direct initiation of the activity. Workflow comprises a sequence of tasks performed by a device or worker or both. An object or data object comprises a grouping of data, executable instructions or a combination of both or an executable procedure.

A workflow processor, as used herein, processes data to determine tasks to add to or remove from a task list or modifies tasks incorporated on, or for incorporation on, a task list. A task list is a list of tasks for performance by a worker or device or a combination of both. A workflow processor may or may not employ a workflow engine. A workflow engine, as used herein, is a processor executing in response to predetermined process definitions that implement processes responsive to events and event associated data. The workflow engine implements processes in sequence and/or concurrently, responsive to event associated data to determine tasks for performance by a device and or worker and for updating task lists of a device and a worker to include determined tasks. A process definition is definable by a user and comprises a sequence of process steps including one or more, of start, wait, decision and task allocation steps for performance by a device and or worker, for example. An event is an occurrence affecting operation of a process implemented using a process definition. The workflow engine includes a process definition function that allows users to define a process that is to be followed and includes an Event Monitor, which captures events occurring in a Healthcare Information System. A processor in the workflow engine tracks which processes are running, for which patients, and what step needs to be executed next, according to a process definition and includes a procedure for notifying clinicians of a task to be performed, through their worklists (task lists) and a procedure for allocating and assigning tasks to specific users or specific teams.

FIG. 1 shows user interface system 10 for presenting patient medical problem information to a user. System 10 includes processing devices (e.g., workstations or portable devices such as notebooks, Personal Digital Assistants, cell phones) 12 and 14, at least one repository 17, Clinical Information System Application (CIS) 51 and server 20, inter-communicating via network 21. Processing devices 12 and 14 individually include memory 28 and display processor 26. Display processor 26 provides data representing display images for presentation on processing device 12 and 14. Server 20 includes first and second search processors 15 and 19, input processor 29, problem data processor 36 and workflow processor 34. First search processor 15 automatically searches a knowledge base of information (repository 17) associating multiple different medical problems with corresponding attributes to find an attribute indicating a particular characteristic of a particular medical problem, in response to occurrence of an event. Display processor 26 initiates generation of data representing a display image. The display image includes, a first image area for including data indicating candidate medical problems and associated attributes and a second image area for including data representing assigned medical problems of a particular patient and enabling a user to select a medical problem for transfer from the first image area to the second image area.

Display processor 26 dynamically generates data representing the display image to include data indicating a candidate medical problem and an associated attribute in response to searching the knowledge base of information and occurrence of the event. Input processor 29 automatically acquires data representing a candidate medical problem from data in a plan of care of a particular patient. Second search processor 19 automatically searches a knowledge base of data indicating different medical problems to identify candidate medical problems in response to user entry of search criteria. Display processor 26 presents one or more display images enabling a user to, initiate execution of clinical information system 51 applications to provide a user with a clinical application display images via processing device 12. Workflow processor 34 initiates tracks and monitors task sequences involving patient problems derived by dynamically generating an interface display image using a problem definition in a knowledge base in repository 17, in response to events. Problem data processor 36 processes problem data including problem attributes and attribute properties in the knowledge base in supporting functions activated using display images.

System 10 provides nursing problem user interface image displays, for example, by dynamically generating an interface display image using a problem definition acquired from a knowledge base in repository 17. In one embodiment, a generated UI display image, presented by display processor 26 on device 12, is DHTML (Dynamic HyperText Markup Language) based and usable for communicating with a knowledge base in repository 17 server. The Problem UI is generated dynamically, it includes a relatively simple structure that creates a window for hosting dynamically placed UI image elements (e.g., controls such as menus, dialogs, an image area, selectable buttons, option lists etc.). The level of detail of information is determined by the knowledge base and dynamically determined by DHTML code representing user interface images during image generation. In addition, a UI display image includes a UI image element representing an "ask and answer" functional interface enabling a nurse to communicate with the knowledge base by using system 10 to query the knowledge base to find candidate nursing problems, for example.

System 10 dynamically builds UI display images using a problem definition derived from a knowledge base. The granularity level of a dynamically generated UI display image is determined in response to particular characteristics of problems, the patient information, and information required for presentation in a UI display image. The particular characteristics are called attributes of the problems. Attributes include major (structural) characteristics of the problems, supplemental characteristics of the problem, characteristics of the patient and characteristics of the UI presentation, for example. An individual attribute has a value and an individual value has a data type. The data type comprises a number, identifier, a coded value, a text string or date and time. The allowable value set of attributes is determined by the knowledge base in repository 17. In addition, context-sensitive UI characteristics are include attributes of problems in the knowledge base.

FIGS. 2-5 show a Problem definition structure advantageously employed by the knowledge base of repository 17. FIG. 2 shows a table listing significant attributes of the "chest pain" problem and as comparison, FIG. 3 shows a table listing significant attributes of the "anxiety" problem. Not all attributes of the "chest pain" problem are listed in FIG. 2, neither are all the attributes of the "anxiety" problem listed in FIG. 3. The tables of FIGS. 2 and 3 also list some of the properties of the listed attributes. FIG. 4 shows a table indicating definition, meaning and category of problem attributes and FIG. 5 shows a table listing characteristics and purpose of problem attribute properties.

FIG. 2 shows a table listing chest pain attributes by name in column 220 including focus 203, judgment 205, bearer 207, body site 209, severity 211, level of certainty 213, priority 215 and status 217. Properties of problem attributes are listed in columns associated with the attributes including whether an attribute is required 222, has a fixed value 224 or a default value 226. Properties of problem attributes also indicate data type 228, allowable values 230, display sequence 232 and label 234. FIG. 3 similarly shows a table listing anxiety attributes by name in column 260 including focus 203, judgment 205, bearer 207, related factors 249, status 251, onset 253 and level of certainty 213. The FIG. 3 attributes have similar attribute properties to those identified in FIG. 2. Allowable values 230 may vary based on patient demographic data such as age, gender height and weight for example.

Display processor 26 provides DHTML based display images and communicates with knowledge server 20 and repository 17. Display images are built dynamically by display processor 26 employing a structure that creates a window for hosting dynamically placed user interface controls (image elements). The level of detail of information presented in an image provided by display processor 26 is determined by the problem data structure in the repository 17 knowledge base. An exemplary problem data structure is illustrated in FIGS. 2 and 3 and comprises attributes, categories and attribute properties as described in FIGS. 4 and 5. FIG. 4 shows a table indicating definition, meaning and category of problem attributes. Specifically, FIG. 4 indicates category (column 270) and definition (column 272) of problem attributes (column 268). Category 270 indicates whether an attribute concerns attributes content or a patient, for example. Definition 272 describes the attributes listed in column 268 including, bearer 207, body site 209, focus 203, related factors 249, judgment 205, level of certainty 213, status 251 and onset 253.

FIG. 5 shows a table listing characteristics and purpose of problem attribute properties. Specifically, the table of FIG. 5 indicates attribute properties in column 303 and corresponding attribute property description in column 306, UI display image behavior associated with an attribute property in column 309 and attribute property effect on related application execution behavior in column 311. Attribute properties in column 303 include whether an attribute is allowed 313, is required 222, has a default value 226 or fixed value 224, allowable values 230, label 234 and data type 228.

The behavior of a UI display image is dynamically determined by display processor 26 (FIG. 1) during rendering of the image on processing device 12. In addition, a UI display image includes an image element enabling a nurse, for example, to initiate an "ask and answer" function whereby the nurse communicates with the knowledge base in repository 17 by querying the knowledge base to find potential nursing problems. A query includes search terms comprising core terms, for example and their synonyms employed in the knowledge base.

FIGS. 6-9 illustrate user interface display images of a nursing problem application (e.g., in problem processor 36 of FIG. 1). Specifically, FIG. 6 display image 603 illustrates features of knowledge based nursing problem application user interfaces. Image 603 includes multiple UI image elements. Window area 605 includes suggested problems (e.g., activity intolerance, fatigue, anxiety and chest pain). Suggested problems are automatically derived from clinical applications in Clinical Information System 51 using a knowledge base service to evaluate findings and existing problems to determine a list of additional candidate nursing (or medical) problems. Candidate Problems appearing in image window 605 are suggestions and are not yet "Assigned Patient Problems". The addition of attributes of nursing problems associated with image window 605 items is supported by the knowledge base in repository 17 (FIG. 1). For example, the addition of important information such as a severity attribute 619 of a Chest Pain problem is indicated in image window 605. In contrast, Activity Intolerance problem 621 does not have any additional attribute information.

In order to assign a problem to a patient, a user selects a problem using a checkbox in column 609 and selects transfer button 613. This removes the selected problem from image window 605 and places it Assigned Problems image window 607 as long as the selected problem is not a duplicate of an existing patient problem. Problem processor 36 (FIG. 1) determines if a candidate problem is a duplicate of an existing patient problem prior to transfer to Assigned Problems window 607. Also, in response to a selected problem being transferred to Assigned Problems window 607, problem processor 36 verifies that attributes are allocated default values. If not, problem processor 36 initiates generation of a warning message indicating to a user that a necessary attribute is missing from the selected problem. Image window 607 presents Assigned problems comprising active patient problems for the patient concerned and represents a short summary of user selectable active patient problems. Not all the attributes for a problem may be shown in image 603. Problem processor 36 distinguishes existing problems from newly assigned problems and allows a user to delete newly assigned problems before saving a problem list.

Image window 623 includes tabs 615 and 617 for initiating functions supporting a problem catalog search to identify and assign a new currently un-suggested problem to a patient. A user selects tab 617 (Adhoc) to initiate a text and synonym search of repository 17 for a problem. A user enters a text string into image window 623 and in response to user selection of tab 617, after a delay (e.g., one second), a query is sent to problem processor 36 in knowledge server 20. Processor 36 searches repository 17 to identify problems represented by text names by searching the text names for user entered text or synonym strings that at least partially match.

Figure 7:
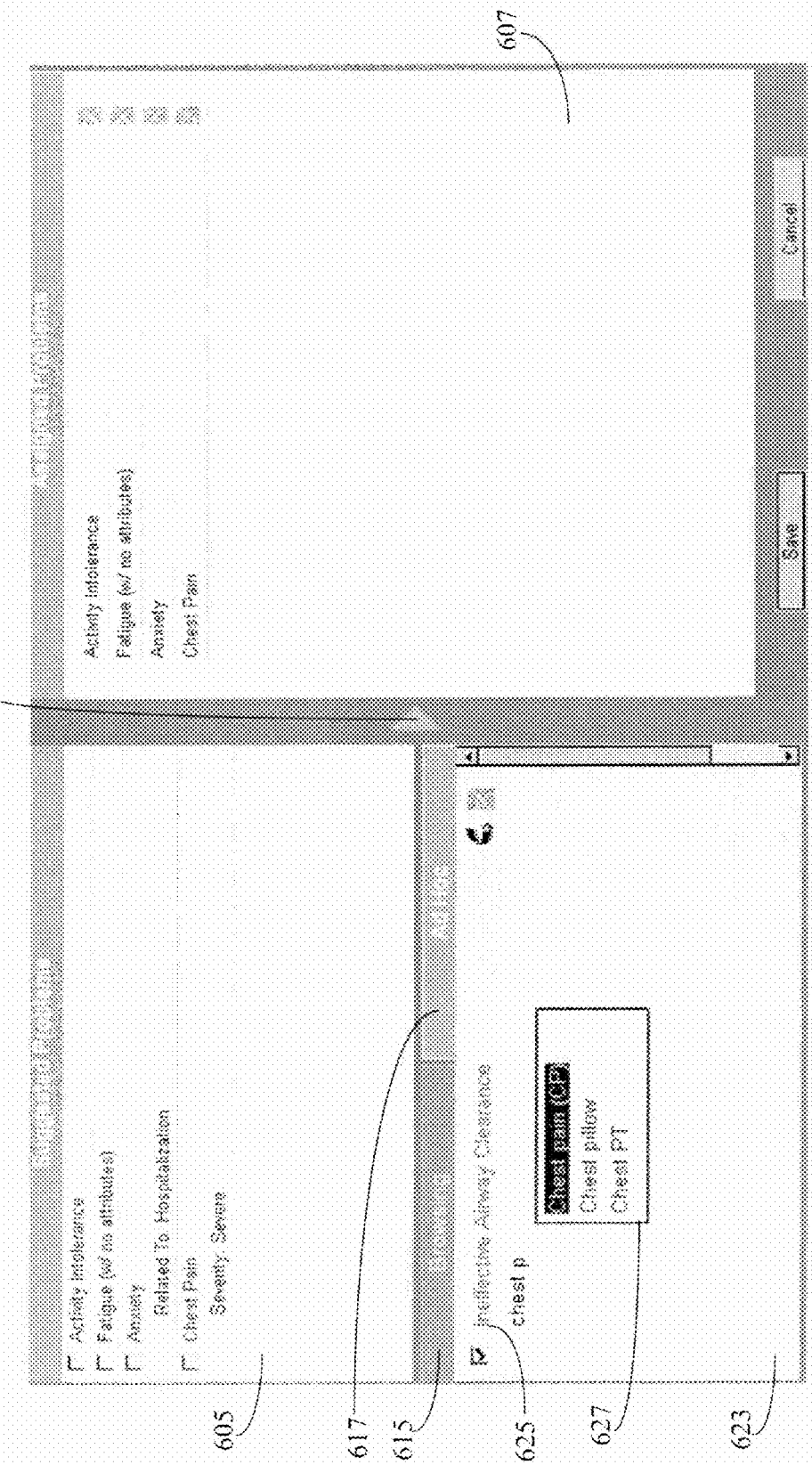

FIG. 7 illustrates user interface display image window 623 presenting problem results 625 of an Adhoc search. Problem search results derived by a query are presented in small popup display window 627 allowing a user to select a problem for incorporation in window 623 such as problem 625. Image window 623 also comprises a free text entry field that allows a user to assign a non-coded problem to a patient. A free text entered problem is a string that allows a user to freely describe a patient problem without having to choose a codified problem. In similar fashion to window 605, a user selects a problem, e.g., using a checkbox or by highlighting, in window 623 and selects transfer button 613 to assign the selected problem to a patient and transfer the problem to window 607.

Figure 8:
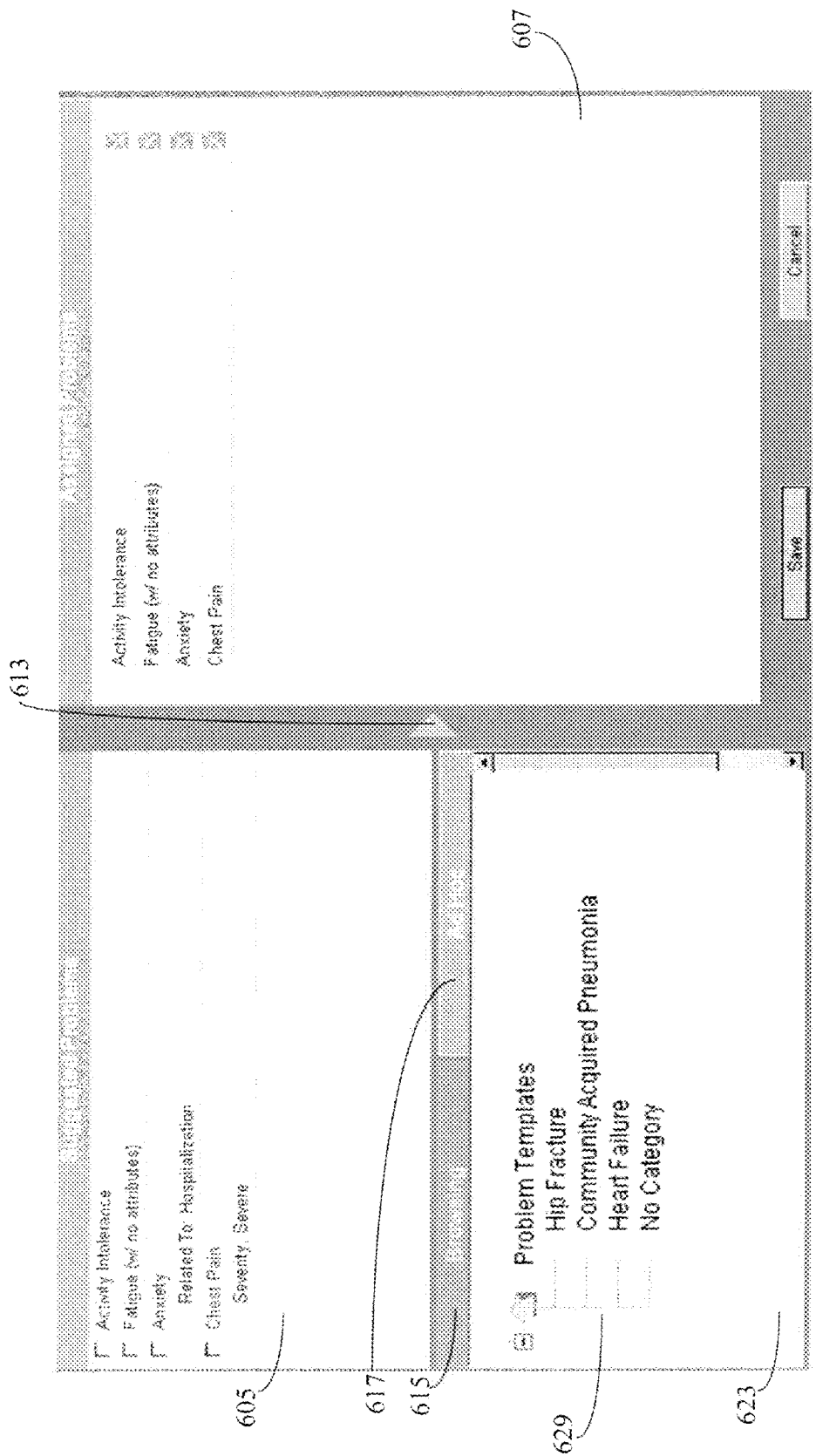

FIG. 8 illustrates operation of a Browsing search function for finding problems in response to user selection of tab 615. Specifically, user interface display image window 623 presents problems 629 in a hierarchical classification system predetermined by a user by selection of configuration options for organizing data derived from the knowledge base repository 17. Hierarchical problem classification 629 comprises problem templates including Hip fracture, Community acquired pneumonia, Heart failure and non-categorized templates, for example. As previously described, a user selects a problem in window 623 and selects transfer button 613 to assign the selected problem to a patient and transfer the problem to window 607.

Figure 9:
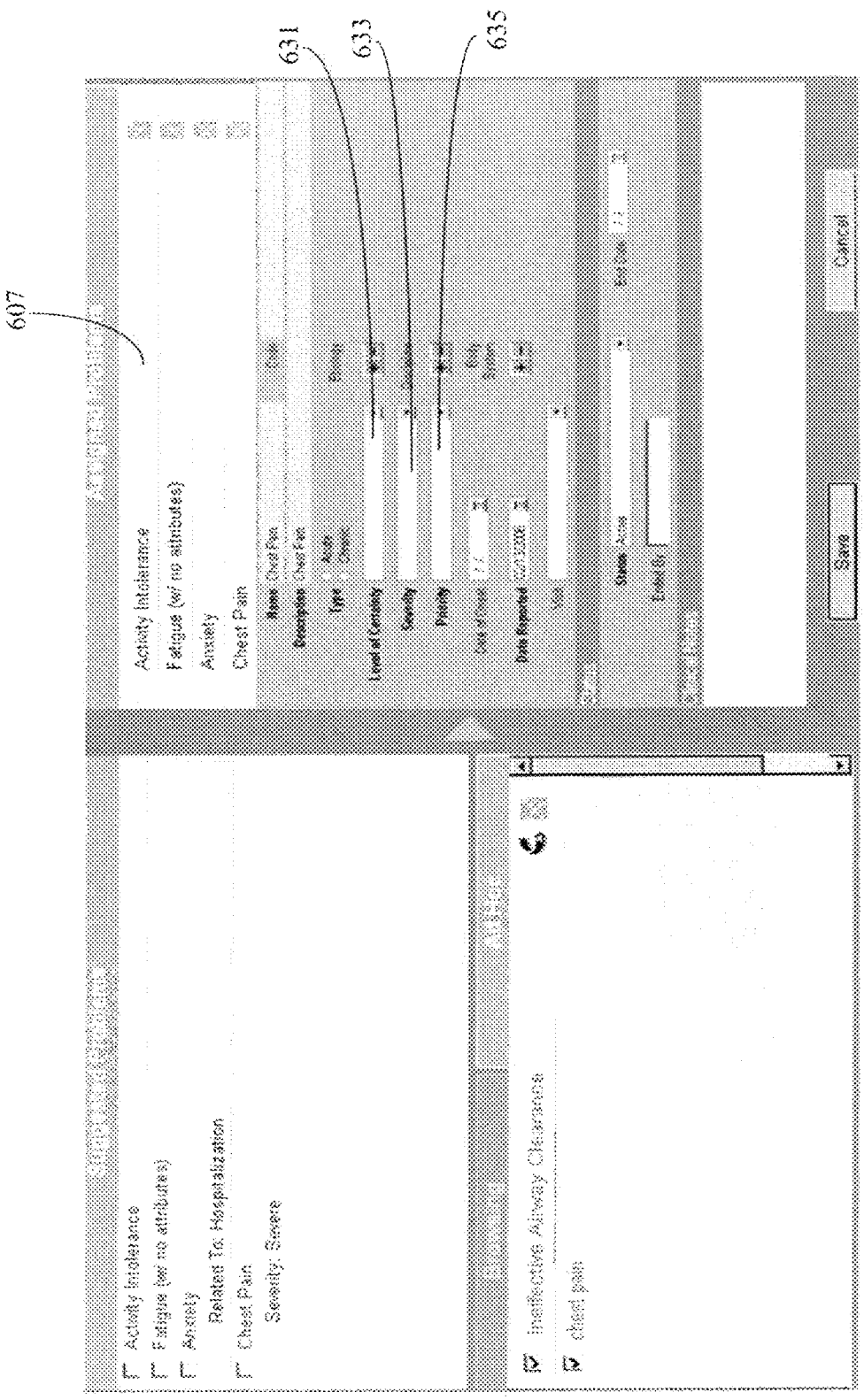

FIG. 9 illustrates display of detailed nursing problem information with fully expanded attribute data, in response to a user selecting an Assigned problem from a list of patient problems in window 607. The display image comprises a columnar display of labels and controls that are dynamically rendered to enable acquisition of user entered data indicating specific attributes that are associated with a selected problem. Attributes associated with problems vary from problem to problem. If attribute information, e.g., level of certainty 631, severity 633 and priority 635, has already been acquired, it is displayed in window 607, in response to a user selecting an Assigned problem from a list of patient problems in window 607.

Figure 10:
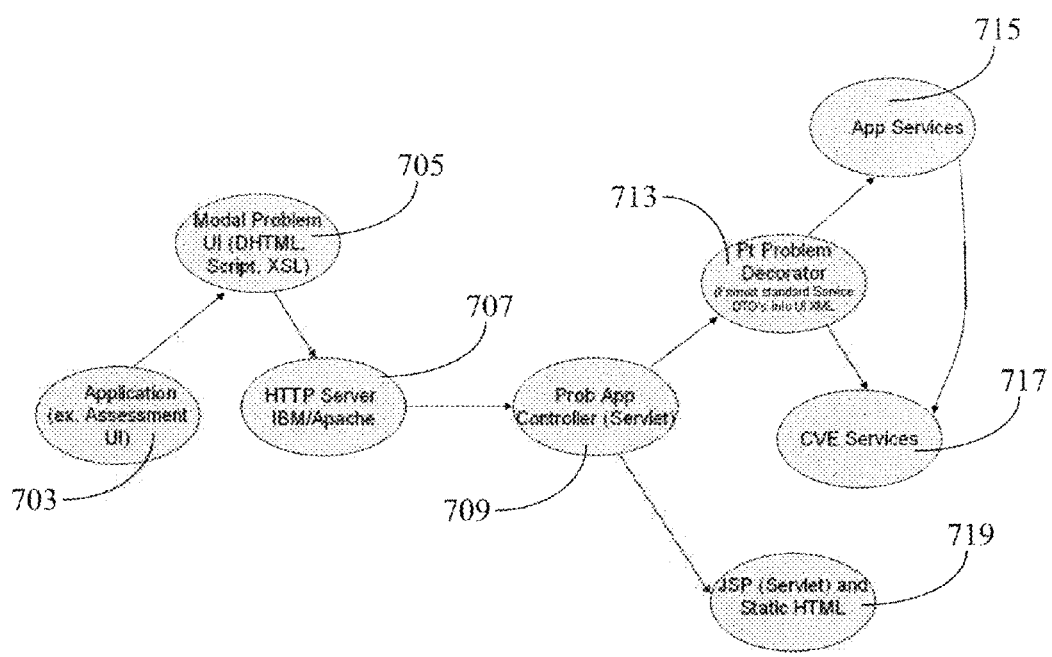
FIG. 10 shows a user interface system for providing data representing user interface display images of a nursing problem application, according to invention principles.

FIG. 10 shows user interface system 90 employed by display processor 26 (FIG. 1) for providing data representing user interface display images of a nursing problem application employed by problem processor 36. System 90 involves an existing clinical UI Application 703. UI Application 703 initiates a Knowledge Base service function 705 to identify candidate problems in response to completion of an assessment of a patient or other clinical function for a patient and directs a user to a modal dialog to display UI images of a nursing problem application. The nursing problem application includes a user interface system providing a hosting shell, a repository of candidate problems, an adhoc query management function (as described in connection with FIG. 7) and browsing function (as described in connection with FIG. 8) and a repository of data indicating assigned problems. Nursing problem user interface 705 is implemented using DHTML executable procedures and also uses JavaScript and XSL to request data and dynamically populate display images with image elements (icons, user selectable buttons, option lists, for example) as well as data. Nursing problem user interface 705 uses an AJAX (Asynchronous JavaScript and XML) compatible HTTP request object to communicate with a standard HTTP server 707 in one embodiment, for example.

HTTP Server 707 (e.g., IBM Websphere or Apache compatible server application) handles HTTP requests and responses for Browser user interfaces provided by unit 705 by maintaining connection information and application state for browser client applications. The nursing problem application does not use HTTP session state for storing application state, instead it keeps most of its state in a Document Object Model on the browser and stores the state in a knowledge base in repository 17 in response to a user saving modifications. A Document Object Model is a specification for a programming interface (API) that allows programs and scripts to update the content, structure and style of HTML and XML documents. A Document Object Model implementation in a Web browser provides a core set of functions that let scripts access browser elements such as windows and history.

Problem Application Controller Servlet 709 is initiated by server 707 and is an authored webserver component that serves as a controller in a web architecture and is responsible for orchestrating HTTP calls from a client application and routing the calls. Servlet 709 initiates Patient Problem Decorator 713 comprising data access Services to transform Service responses into user interface compatible XML messages. Application Server 715 hosts the application services and is called by unit 713. Unit 713 and application services 715 employ Services 717 to provide meta-information stored within a Knowledge Base in repository 17. Servlet 709 initiates servlets (executable procedures) 719 that use templates that describe HTML user interface images. Servlet 719 generates HTML and binding data for display image elements by dynamically adding image elements to a nursing problem application display image in response to command from servlet 709.

Figure 11:
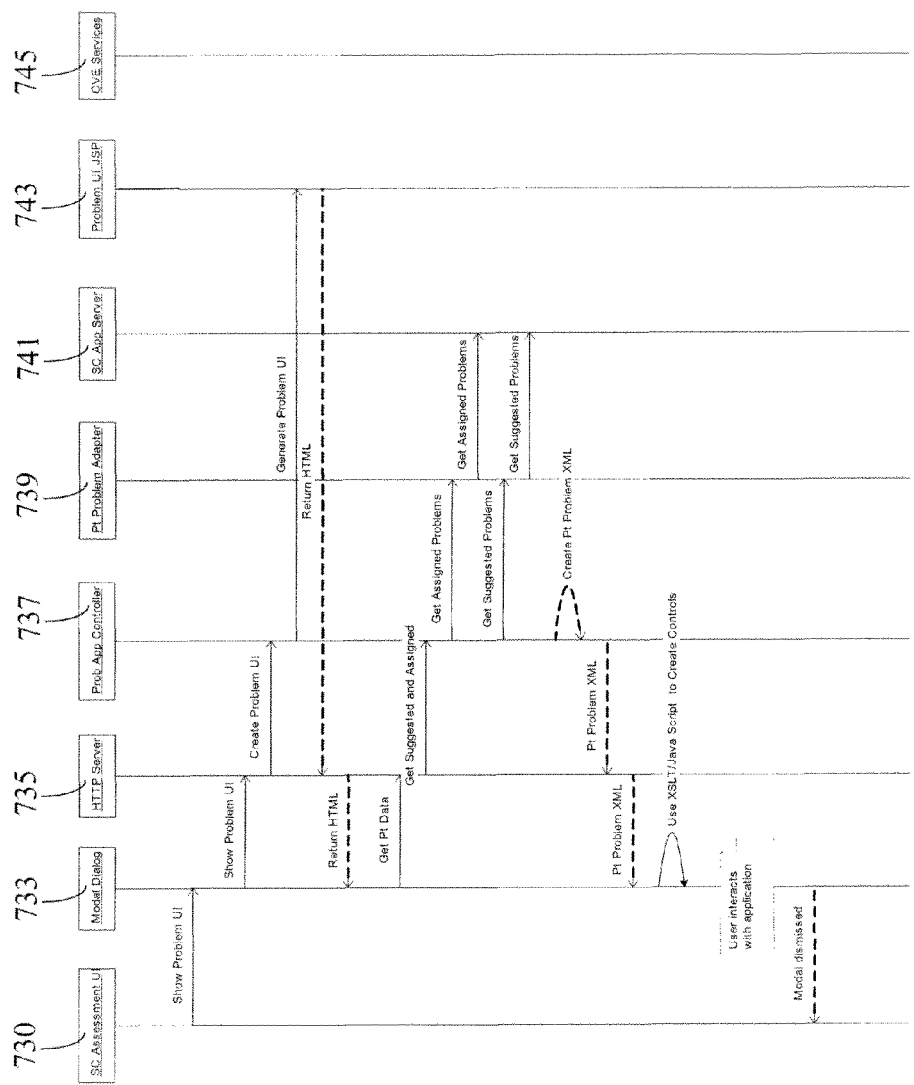
FIG. 11 is a sequence diagram depicting initial Problem Application user interface activation, according to invention principles.

FIG. 11 is a sequence diagram performed by system 90 (FIG. 10) depicting initial user interface activation of a Problem Application. In response to receiving data representing a patient assessment 730, system 90 initiates a modal dialog 733 which directs activation of Problem Application Servlet (procedure) 735. Servlet 735 directs this request to a Java Server Page (JSP) or set of several JSPs 743, via problem application controller 737, in order to produce an empty shell for a problem application user interface. This user interface includes references to Java Script functions which upon loading, request the data from the problem application. This request is directed to servlet 735 which retrieves data representing Patient Problems and candidate problems from repository 17 (FIG. 1) and returns the data to the calling script that places the retrieved data into its Document Object Model and binds it to appropriate user interface image elements in HTML data representing modal dialog 733. Modal dialog 733 enables a user to acquire assigned and candidate patient problem data (in XML) using servlet 735, problem application controller 737, patient problem adapter 739 and application server 741. Problem application controller 737 uses acquired patient data to generate patient problem data in XML (rendered using XSL) and return it to modal dialog 733 via servlet 735

Figure 12:
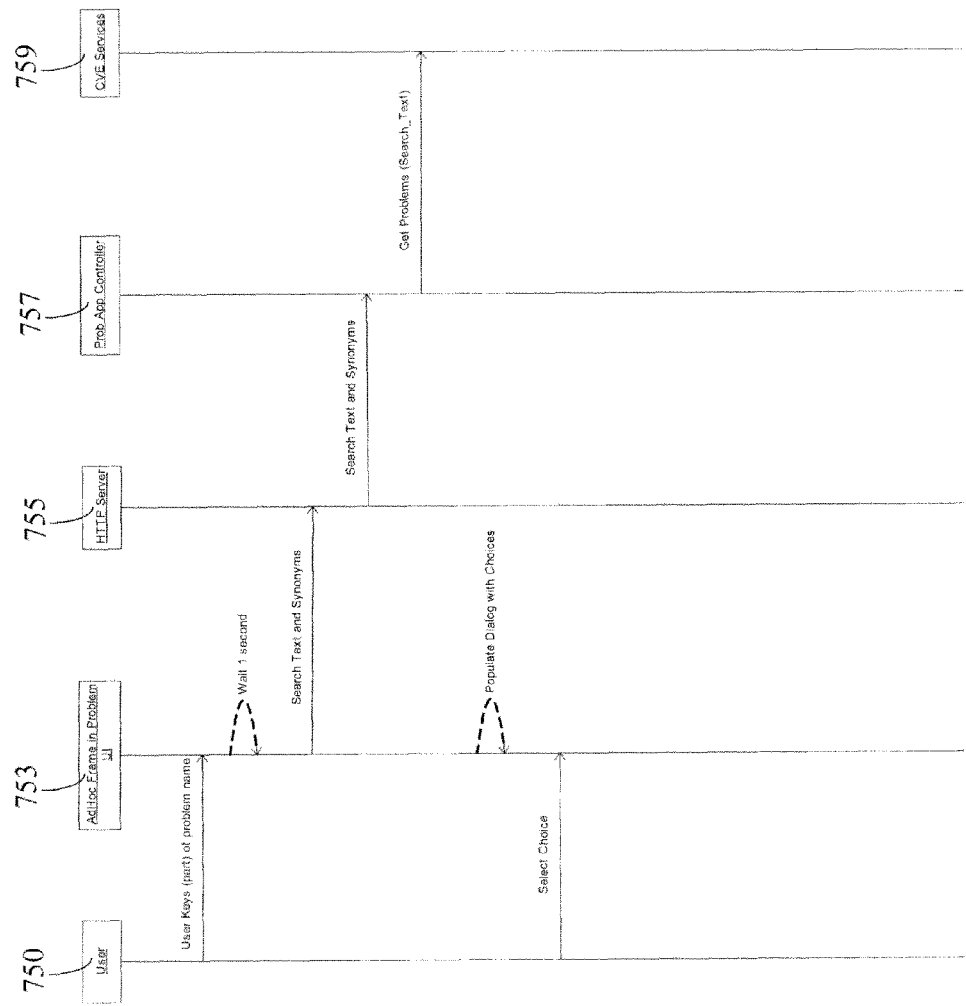
FIG. 12 is a sequence diagram depicting use of an AdHoc Query to select an un-suggested problem, according to invention principles.

FIG. 12 is a sequence diagram performed by system 90 (FIG. 10) depicting use of an AdHoc Query to select an un-suggested problem. In response to a user 750 entering search text representing a name of a problem via a window in a problem user interface display image 753, system 90 delays a short time (e.g., a second) and initiates a service request to servlet 755 (on an HTTP server) to identify problems that contain the user entered text in either problem text or a synonym or attribute of problem definitions in a knowledge base in repository 17 (FIG. 1). Servlet 755 searches for the user entered text in repository 17 using problem application controller 757 and services 759. Search results of the query comprising candidate problems are returned to update a candidate problem list in user interface display image 753 enabling a user to select a particular candidate problem.

Figure 13:
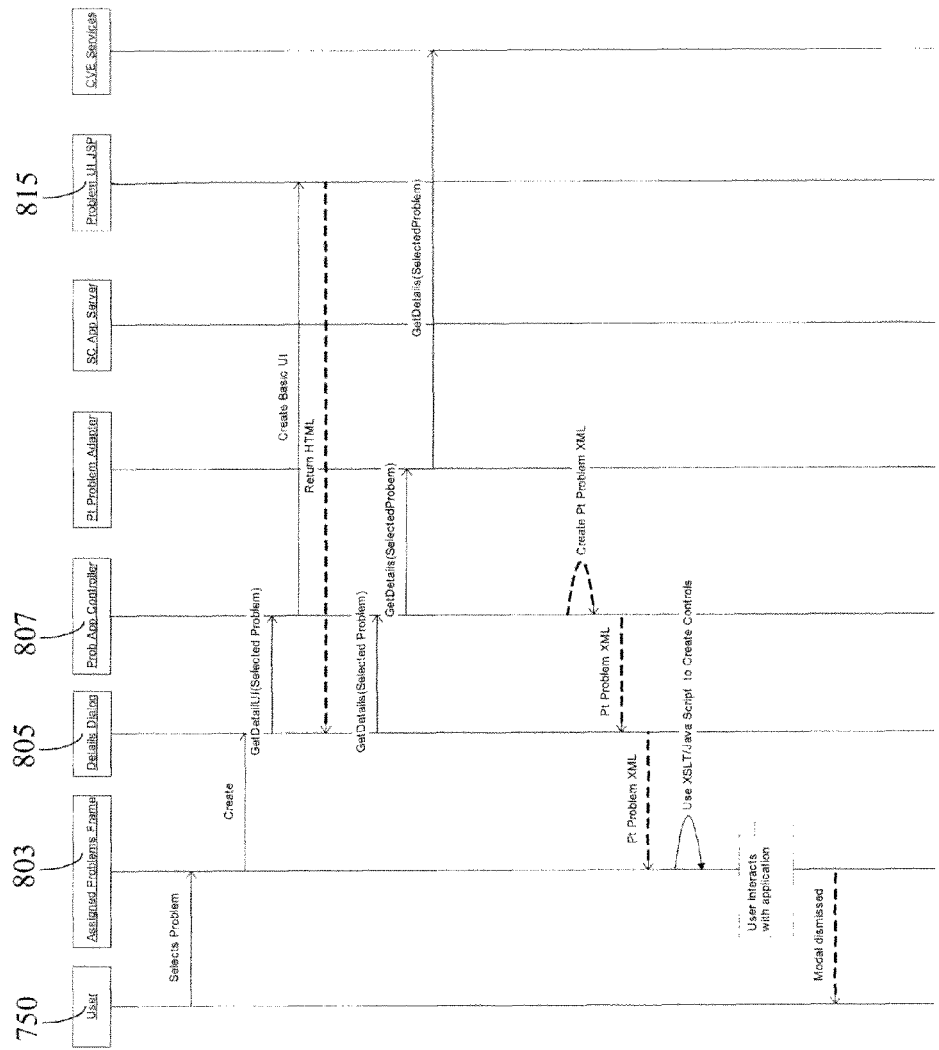
FIG. 13 is a sequence diagram depicting user selection and modification of parameters of an assigned patient problem, according to invention principles.

FIG. 13 is a sequence diagram performed by system 90 (FIG. 10) depicting user selection and modification of parameters of an assigned patient problem. In response to user 750 selection of a problem in an assigned problem window 803 of a user interface display image, system 90 generates a modal dialog window 805 and initiates execution of problem user interface application Java Server Page 815 via problem controller 807. Executed javascript in page 815, upon loading of a form, requests data to be bound to image elements in a problem user interface image. The requested data includes two service requests. Specifically, a first service request acquires a definition of problems (including parameters, and parameter meta-data such as allowed values, required ness, default values for individual problems). A second service request acquires detailed data concerning a selected patient problem. A combined response to the first and second service requests is returned to modal dialog window 805, where XSL script dynamically arranges image elements and populates elements (e.g., a problem list of individually selectable problems) with the appropriate values and allowed values.

Figure 14:
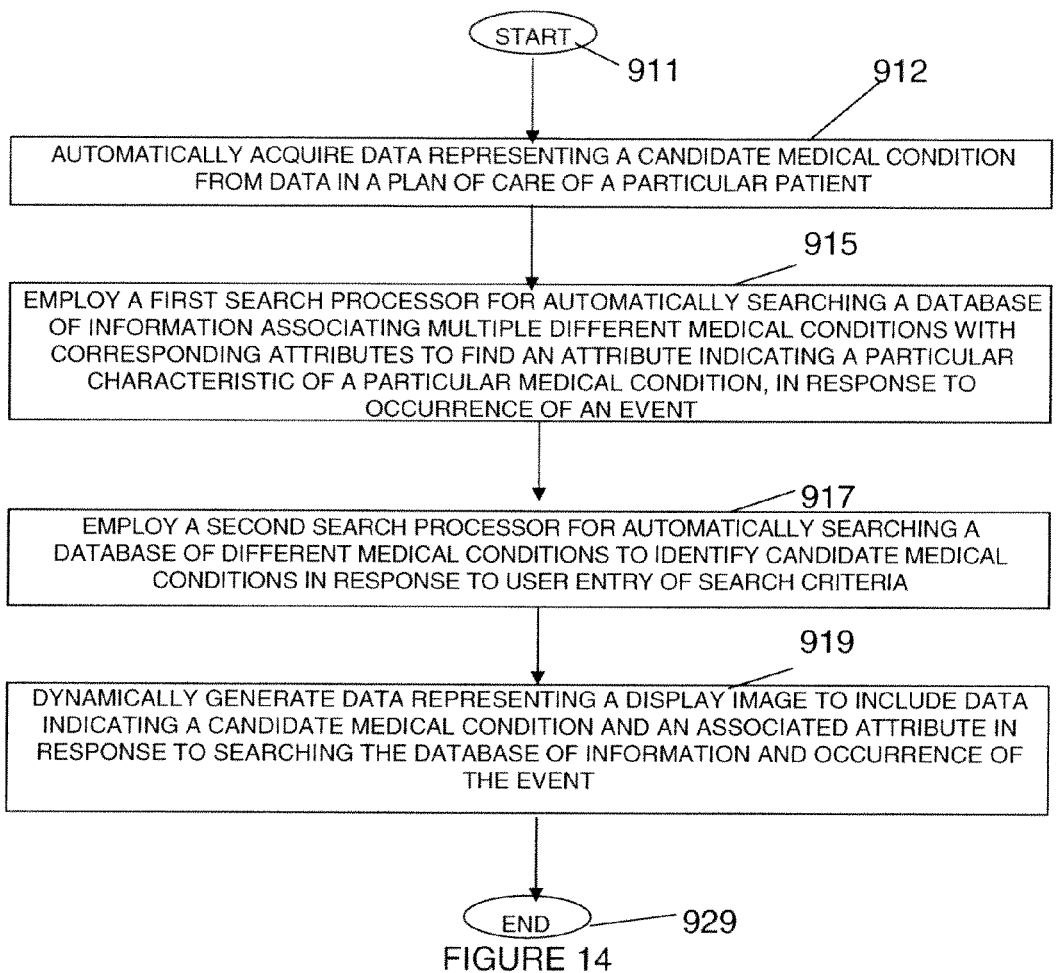
FIG. 14 shows a flowchart of a process performed by a user interface system for presenting patient medical problem information to a user, according to invention principles.

FIG. 14 shows a flowchart of a process performed by user interface system 10 for presenting patient medical problem information to a user. In step 912 following the start at step 911, input processor 29 (FIG. 1) automatically acquires data representing a candidate medical problem from data in a plan of care of a particular patient. A medical problem comprises a medical condition of a patient. In step 915, first search processor 15 automatically searches a knowledge base (in repository 17) of information associating multiple different medical problems with corresponding attributes to find an attribute indicating a particular characteristic of a particular medical problem, in response to occurrence of an event. The event comprises at least one of, (a) user selection of a candidate medical problem of a particular patient in the first image area, (b) a user command entered via the display image, (c) receiving data representing a candidate medical problem and (d) automatically deriving a candidate medical problem.

First search processor 15 performs a patient specific search by searching the knowledge base of information to find an attribute indicating a particular characteristic of a particular medical problem for a particular patient based on received patient specific information including at least one of, (a) patient demographic related data, (b) known patient medical problems and (c) medical findings. The medical findings indicate, vital signs, symptoms or laboratory test results of the patient. The patient demographic related data includes at least one of, (i) gender, (ii) age, (iii) height and (iv) weight. In step 917, second search processor 19 automatically searches a knowledge base (in repository 17) of different medical problems to identify candidate medical problems in response to user entry of search criteria.

In step 919, display processor 26 dynamically generates data representing a display image to include data indicating a candidate medical problem and an associated attribute in response to searching the knowledge base of information and occurrence of the event. The display image includes, a first image area including data indicating candidate medical problems and associated attributes and a second image area including data representing assigned medical problems of a particular patient and enabling a user to select a medical problem for transfer from the first image area to the second image area. The layout and content of data is displayed in the first image area in response to attribute properties. Display processor 26 automatically filters attribute data associated with a candidate medical problem for presentation in the first image area in response to one or more of, data indicating a role of a user, predetermined user personal preference data and characteristics of a candidate medical problem. In one embodiment the knowledge base of information includes multiple hierarchically arranged attributes associated with a candidate medical problem. Display processor 26 automatically filters hierarchically arranged attribute data associated with a candidate medical problem to exclude attributes of a predetermined hierarchical level in providing attributes for presentation in the first image area in response to at least one of, (a) data indicating a role of a user and (b) predetermined user personal preference data. The attribute properties include one or more of, whether an attribute is required, whether an attribute has a fixed value and whether an attribute has a default value. The attribute properties also indicate at least one of, data type of an attribute, allowable values of an attribute, display sequence of attributes and labels of attributes. The process of FIG. 14 terminates at step 929.

The systems and processes of FIGS. 1-14 are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. System 10 dynamically builds UI display images with a level of detail determined in response to particular characteristics of problems, patient information, and information required for presentation in a UI display image. The processes and applications may, in alternative embodiments, be located on one or more (e.g., distributed) processing devices accessing a network linking the elements of FIG. 1. Further, any of the functions and steps provided in FIGS. 1-14 may be implemented in hardware, software or a combination of both and may reside on one or more processing devices located at any location of a network linking the elements of FIG. 1 or another linked network, including the Internet.

What is claimed is:

1. A user interface system for presenting patient medical problem information to a user, comprising:
    a search processor for automatically searching a knowledge base of information associating a plurality of different medical problems with corresponding attributes to determine at least one additional candidate nursing problem associated with an existing assigned medical problem of a particular patient and to determine an attribute indicating a particular characteristic of a particular nursing problem comprising at least one of focus, judgment, bearer, body site, severity, level of certainty, priority and status, in response to an existing assigned problem of said particular patient; and
    a display processor for initiating generation of data representing a single display image, said display image including,
        a first image area for including data indicating candidate nursing problems and associated attributes and
        a second image area for including data representing existing assigned medical problems of said particular patient including said existing assigned medical problem and enabling a user to select a nursing problem for transfer from said first image area to said second image area.

2. A system according to claim 1, wherein
said nursing problems comprise at least one of, activity intolerance, fatigue, anxiety and chest pain and
said display processor dynamically generates data representing said display image to include data indicating a candidate medical problem and an associated attribute in response to searching said knowledge base of information.

3. A system according to claim 1, including
an input processor for automatically acquiring data representing a candidate medical problem from data in a plan of care of a particular patient.

4. A system according to claim 1,
said search processor automatically searches said knowledge base of different medical problems to identify candidate medical problems in response to user entry of search criteria.

5. A system according to claim 1, wherein
said search processor automatically searches said knowledge base of information to determine the nursing problem attribute in response to a clinical finding associated with said particular patient.

6. A system according to claim 1, wherein
said search processor automatically searches said knowledge base of information in response to at least one of, (a) receiving data representing a candidate medical problem, (b) automatically deriving a candidate medical problem and (c) a user command entered via said display image.

7. A system according to claim 1, wherein
a medical problem comprises a medical problem of a patient.

8. A system according to claim 1, wherein
said search processor performs a patient specific search by searching said knowledge base of information to find an attribute indicating a particular characteristic of a particular medical problem for a particular patient based on received patient specific information including at least one of, (a) patient demographic related data and (b) known patient medical problems.

9. A system according to claim 1, wherein
said search processor performs a patient specific search by searching said knowledge base of information to find an attribute indicating a particular characteristic of a particular medical problem for a particular patient based on received patient specific information including medical findings indicating at least one of, (a) vital signs, (b) symptoms and (c) laboratory test results of the patient.

10. A system according to claim 8, wherein
said patient demographic related data includes at least one of, (a) gender, (b) age, (c) height and (d) weight.

11. A system according to claim 1, wherein
said display processor automatically filters attribute data associated with a candidate medical problem for presentation in said first image area.

12. A system according to claim 1, wherein
said display processor automatically filters level of detail of attribute data associated with a candidate medical problem for presentation in said first image area in response to at least one of, (a) data indicating a role of a user, (b) predetermined user personal preference data and (c) characteristics of a candidate medical problem.

13. A system according to claim 1, wherein
said display processor initiates generation of data representing a display image including said first image area including data indicating candidate medical problems and associated attributes, layout and content of data being displayed in said first image area in response to attribute properties.

14. A system according to claim 13, wherein
said attribute properties include at least one of, (a) whether an attribute is required, (b) whether an attribute has a fixed value and (c) whether an attribute has default value.

15. A system according to claim 13, wherein
said attribute properties include at least one of, (a) indicate data type of an attribute and (b) allowable values of an attribute.

16. A system according to claim 13, wherein
said attribute properties include at least one of, (a) display sequence of attributes and (b) labels of attributes.

17. A system according to claim 1, including
a knowledge base of information including a plurality of hierarchically arranged attributes associated with a candidate medical problem wherein
said display processor automatically filters hierarchically arranged attribute data associated with a candidate medical problem to exclude attributes of a predetermined hierarchical level in providing attributes for presentation in said first image area in response to at least one of, (a) data indicating a role of a user and (b) predetermined user personal preference data.

18. A user interface system for presenting patient medical problem information to a user, comprising:
a search processor for automatically searching a knowledge base of information associating a plurality of different medical problems with corresponding attributes to determine at least one additional candidate nursing problem associated with an existing assigned medical problem of a particular patient and to determine an attribute indicating a particular characteristic of a particular nursing problem comprising at least one of focus, judgment, bearer, body site, severity, level of certainty, priority and status, in response to an existing assigned problem of said particular patient; and
a display processor for dynamically generating data representing a single display image to include data indicating a candidate nursing problem and an associated attribute in response to searching said knowledge base of information, said display image including,
a first image area for including data indicating candidate nursing problems and associated attributes and
a second image area for including data representing existing assigned medical problems of said particular patient including said existing assigned medical problem and enabling a user to select a nursing problem for transfer from said first image area to said second image area.

19. A user interface system for presenting patient medical problem information to a user, comprising:
a search processor for automatically searching a knowledge base of information associating a plurality of different medical problems with corresponding attributes to determine at least one additional candidate nursing problem associated with an existing assigned medical problem of a particular patient and to determine an attribute indicating a particular characteristic of a particular nursing problem comprising at least one of focus, judgment, bearer, body site, severity, level of certainty, priority and status, in response to an existing assigned problem of said particular patient; and a display processor for dynamically generating data representing a single display image to include data indicating a candidate nursing problem and an associated attribute in response to searching said knowledge base of information, said display image including, a first image area for including data indicating candidate nursing problems and associated attributes and a second image area for including data representing existing assigned medical problems of said particular patient including said existing assigned medical problem and enabling a user to select a nursing 1 problem for transfer from said first image area to said second image area, layout and content of data being displayed in said first image area in response to attribute properties.

* * * * *